(12) United States Patent
Bruno et al.

(10) Patent No.: US 7,377,100 B2
(45) Date of Patent: May 27, 2008

(54) BYPASS DUCT FLUID COOLER

(75) Inventors: Vittorio Bruno, Mississauga (CA); Bryan Olver, Nobleton (CA); John Adam Logan, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 471 days.

(21) Appl. No.: 10/926,967

(22) Filed: Aug. 27, 2004

(65) Prior Publication Data

US 2006/0042225 A1 Mar. 2, 2006

(51) Int. Cl.
*F02K 3/00* (2006.01)
*F02C 7/12* (2006.01)

(52) U.S. Cl. .................... 60/267; 60/266; 60/39.08
(58) Field of Classification Search ............... 60/266, 60/267, 39.08
See application file for complete search history.

(56) References Cited

U.S. PATENT DOCUMENTS

| | | | |
|---|---|---|---|
| 2,474,258 A | 6/1949 | Kroon | 230/207 |
| 2,696,712 A | 12/1954 | Lewis | 60/39.66 |
| 3,475,906 A * | 11/1969 | Madelung | 60/226.1 |
| 3,797,561 A * | 3/1974 | Clark et al. | 60/39.08 |
| 3,842,597 A * | 10/1974 | Ehrich | 60/226.1 |
| 4,151,710 A * | 5/1979 | Griffin et al. | 60/39.08 |
| 4,254,618 A * | 3/1981 | Elovic | 60/226.1 |
| 4,903,760 A | 2/1990 | Joshi et al. | 165/41 |
| 4,914,904 A | 4/1990 | Parnes et al. | 60/226.1 |
| 5,268,135 A * | 12/1993 | Sasaki et al. | 264/210.7 |
| 5,284,012 A | 2/1994 | Laborie et al. | 60/39.08 |
| 5,297,386 A * | 3/1994 | Kervistin | 60/226.1 |
| 5,351,476 A | 10/1994 | Laborie et al. | 60/39.07 |
| 5,806,793 A * | 9/1998 | Brossier et al. | 244/57 |
| 5,823,250 A | 10/1998 | Barten et al. | 165/140 |
| 5,860,471 A * | 1/1999 | Perryment et al. | 165/170 |
| 6,092,360 A | 7/2000 | Hoag et al. | 60/39.02 |
| 6,134,880 A * | 10/2000 | Yoshinaka | 60/226.1 |
| 6,651,929 B2 | 11/2003 | Dionne | 244/57 |
| 7,013,636 B2 * | 3/2006 | Iya et al. | 60/204 |
| 2003/0127218 A1 * | 7/2003 | Sears et al. | 165/170 |

* cited by examiner

*Primary Examiner*—Ted Kim
(74) *Attorney, Agent, or Firm*—Ogilvy Renault LLP

(57) ABSTRACT

A method and apparatus for cooling a fluid in a bypass gas turbine engine involves directing the fluid to the bypass duct of the engine to allow for heat exchange from the fluid to bypass air passing through the bypass air duct.

5 Claims, 4 Drawing Sheets

BYPASS DUCT FLUID COOLER

FIELD OF THE INVENTION

The present invention relates to gas turbine engines, and more particularly to a cooling apparatus for cooling of fluid used in a bypass gas turbine engine.

BACKGROUND OF THE INVENTION

Lubricating oil used in aircraft gas turbine engines must be cooled. Without proper cooling, poor cooling and/or lubrication of gear and bearings results which may cause problems for engine operation. In addition to employing conventional radiator-type oil coolers, the prior art also describes directing oil through inlet guide vanes or support struts to achieve a cooling benefit from air ingested by the engine.

Nevertheless, there is still a need for improvement of the lubricating oil cooling apparatus for gas turbine engines.

SUMMARY OF THE INVENTION

One object of the present invention is to provide a cooling apparatus for cooling of fluid used in a bypass gas turbine engine.

In accordance with one aspect of the present invention, there is a cooling apparatus provided for cooling of a fluid in a bypass gas turbine engine, which comprises a heat exchanger having a fluid passageway mounted to at least one wall of a bypass duct of the engine. The fluid passageway is in fluid communication with a source of the fluid to be cooled and the heat exchanger is in thermal contact with air passing through the bypass duct.

In accordance with another aspect of the present invention, there is a gas turbine engine provided, which comprises a bypass duct adapted to direct bypass air through the engine. The engine further comprises a fluid passageway provided on the bypass duct. The fluid passageway is in fluid communication with an oil system of the gas turbine engine and has thermal contact with the air passing through the bypass duct.

In accordance with a further aspect of the present invention, there is a method provided for cooling a fluid in a bypass gas turbine engine, which comprises a step of directing the fluid to flow directly along a surface defining a periphery of a bypass duct of the engine to thereby permit heat exchange between the fluid and bypass air passing through the bypass duct.

The present invention advantageously provides a cooling apparatus and method for cooling, for example, the lubricating oil used in a bypass gas turbine engine in an effective manner, and the cooling apparatus is light weight and relatively simple.

Further details of these and other aspects of the present invention will be apparent from the detailed description and figures included below.

BRIEF DESCRIPTION OF THE DRAWINGS

Reference will now be made to the accompanying drawings, showing by way of illustration preferred embodiments, in which.

It should be noted that throughout the appended drawings, like features are identified by like reference numerals.

DETAILED DESCRIPTION OF THE PREFERRED EMBODIMENTS

Figure 1:
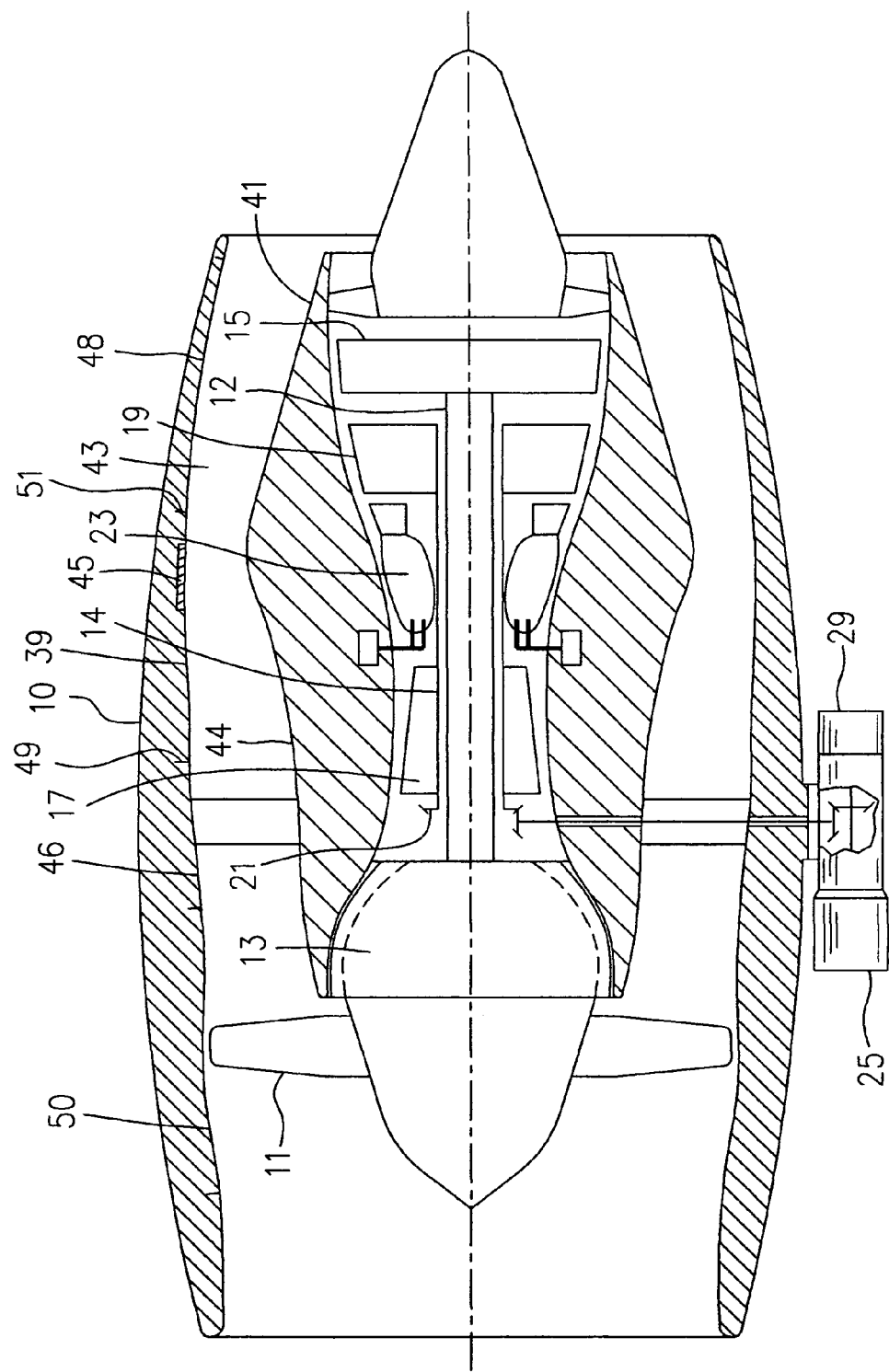
FIG. 1 is a schematic cross-sectional view of a bypass gas turbine engine, showing an exemplary application of the present invention.

A bypass gas turbine engine seen generally in FIG. 1 includes a housing nacelle 10, a low-pressure spool assembly seen generally at 12 which includes a fan 11, a low-pressure compressor 13 and a low-pressure turbine 15, a high-pressure spool assembly seen generally at 14 which includes a high-pressure compressor 17, a high-pressure turbine 19 and a gear 21, a combustor 23 and an accessory-drive assembly 25. An annular bypass duct 43 is defined between an inner bypass duct wall 44 and an outer bypass duct wall 39. A stream of bypass air which is compressed by the fan 11, is directed through the annular bypass duct 43 and discharged therefrom to produce thrust.

The engine has a lubricating system (not indicated) including a pump 29 and a heat-exchanger 45 mounted in this embodiment, to the outer bypass duct wall 39. The heat exchanger 45 is connected in fluid communication with the lubricating system of the engine to allow relatively hot oil to flow therethrough and be thereby cooled by the fast moving stream of bypass air passing through the annular bypass duct 43.

Figure 2:
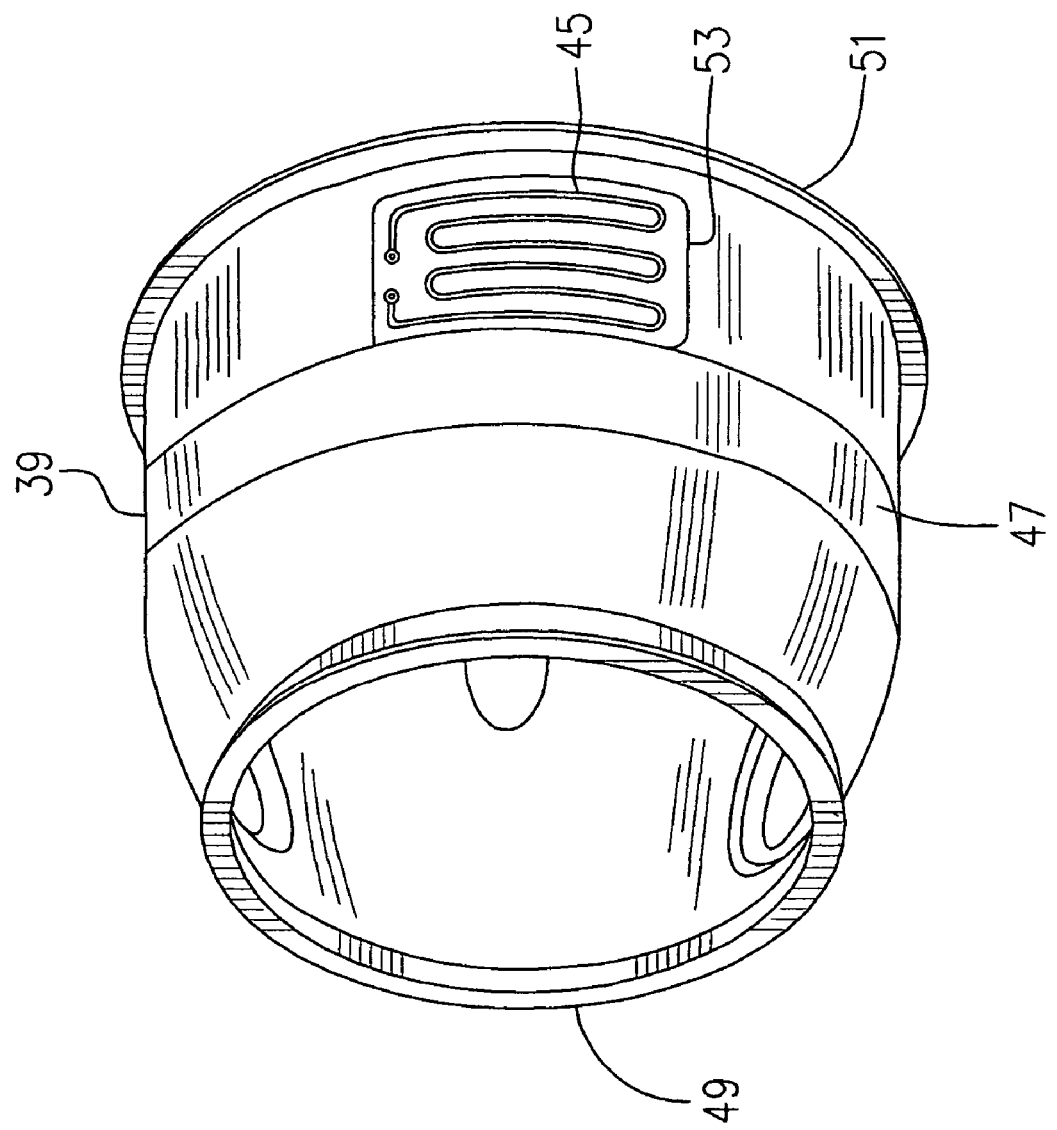
FIG. 2 is an isometric view of the outer bypass duct of FIG. 1 incorporating one embodiment of the present invention.
Figure 3:
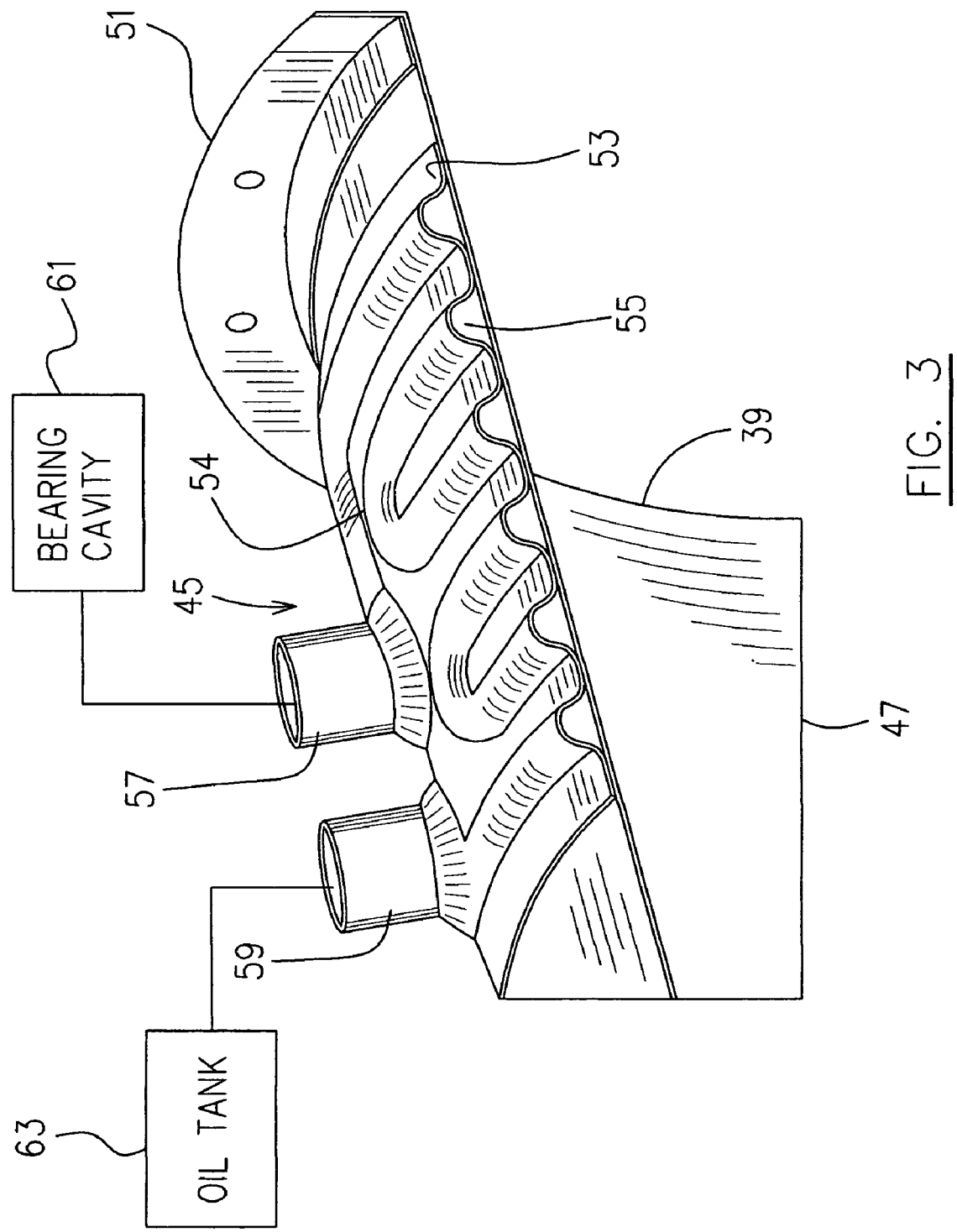
FIG. 3 is an enlarged partial isometric view of FIG. 2.

Referring to FIGS. 2 and 3, the outer bypass duct wall 39 is defined by an annular body 47 preferably made of sheet metal or other suitable metal configuration. Metal is preferred to provide good heat transfer properties. The front end of the annular body 47 has an opening with a radially extending flange 49 to be connected to an intermediate case 46 which is further connected to a fan case 50 (see FIG. 1). The rear end of the annular body 47 has a radially extending flange 51 to be connected with an engine exhaust duct 48 (see FIG. 1). A cooler 53, in this example comprised of a piece of sheet metal with a depressed portion 55 fabricated preferably in a sheet metal stamping or other metal forming process, is provided. The depressed portion 55 is preferably formed as a labyrinth-like fluid passageway 54 or serpentine or tortuous passageway 54 which is defined between the cooler 53 and the annular body 47 of the outer bypass duct wall 39, to thereby configure heat exchanger 45. The cooler 53 is preferably attached at the rear end of the annular body 47.

The cooler 53 is preferably sealingly mounted to the outer bypass duct wall 39, for example by welding, such that a fluid in fluid passageway 54 is directed over the surface of the outer bypass duct wall 39. Direct contact between the flowing fluid and outer bypass duct wall 39 permits heat exchange.

Preferably, a pair of tube fittings used as connectors are welded in fluid communication the fluid passageway 54, thereby forming an inlet 57 and an outlet 59 of the fluid passageway 55. The inlet 57 is preferably in fluid communication with a source of the lubricating oil to be cooled, for example, from a bearing cavity 61 of a main shaft of the engine, or a gear arrangement (not shown), etc., preferably including an oil pump (not shown). The outlet 59 is preferably in fluid communication with a fluid return device, such as an oil tank 63 or oil scavenging system.

Referring to FIGS. 1-3, the heat exchanger 45 is preferably integrally attached to the outer surface of the outer bypass duct wall 39, thereby being positioned adjacent but outside the annular bypass duct 43 and thereby thermally contacting the fast-moving stream of bypass air flowing through the annular bypass duct 43. Heat is exchanged from the heat exchanger 45 to the fast-moving stream of bypass air in duct 43.

The cooling of the heat exchanger 45 can be altered by altering the size and/or configuration and/or placement of the heat exchanger 45. Advantageously, there is a relatively large surface of the annular body of the outer bypass duct wall 39 which is available for use in conjunction with the heat exchanger 45.

Figure 4:
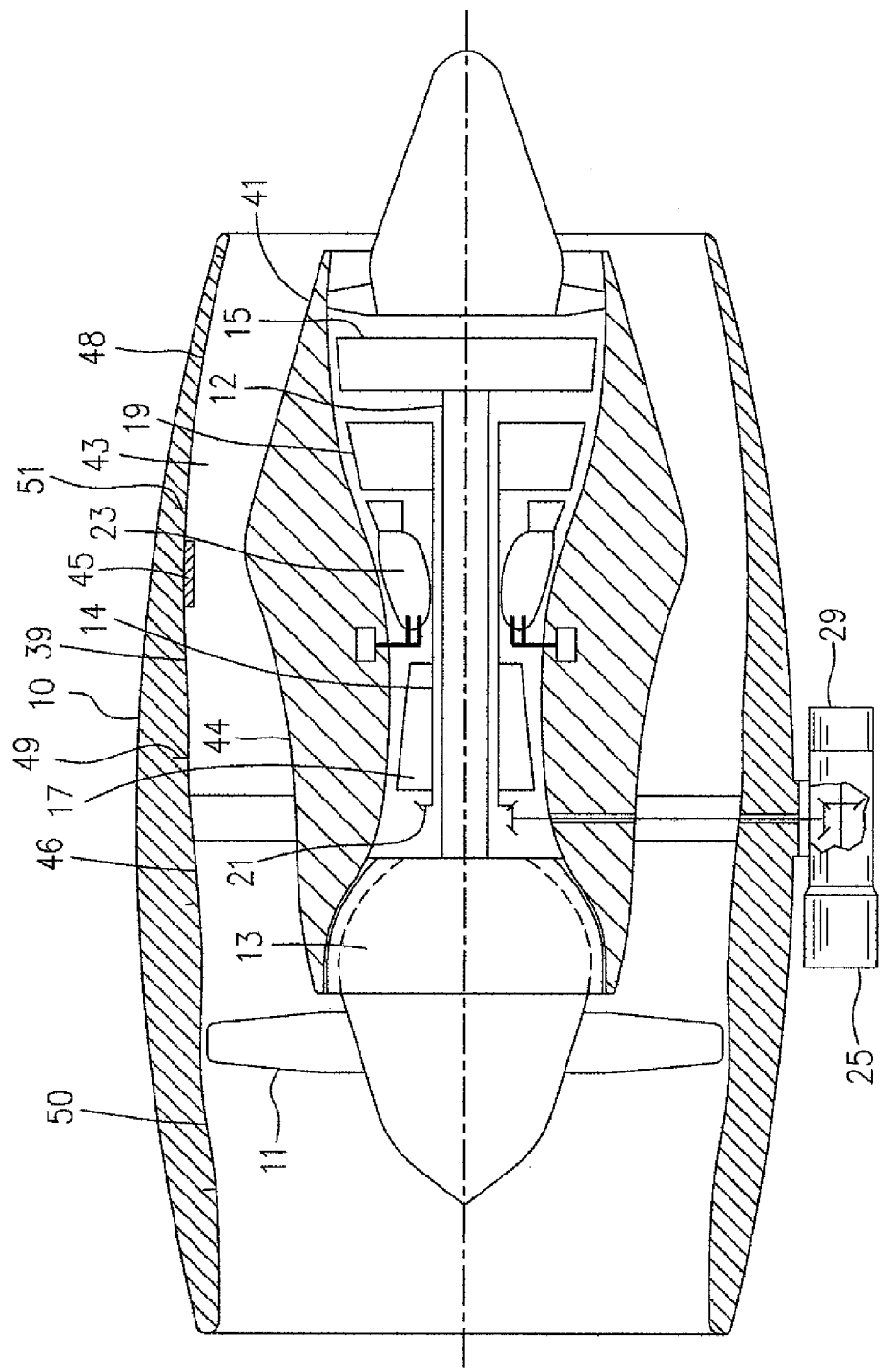
FIG. 4 is a partial schematic cross-sectional view of the bypass as turbine engine of FIG. 1, showing an alternative location of the heat exchanger according to another embodiment of the present invention.

Heat exchanger 45 can be mounted to inner bypass duct wall 44. Heat exchanger 45 can be placed outside of the flow in bypass duct 43 (i.e as depicted in FIG. 1) or can be provided directly in the flow passing through bypass duct 43 (i.e as depicted in FIG. 4). The configuration of FIG. 1 is preferred to minimize air flow losses and flow noise by minimizing air flow path disturbances in bypass duct 43 caused by heat exchanger 45. The configuration of FIG. 1 also reduces the possibility that oil (or whatever fluid is to be cooled) can leak into the bypass flow.

The heat exchanger 45 can be formed in any appropriate shape and can be mounted in any suitable fashion. For example, the heat exchanger 45 need not be serpentine, and/or may be attached by a metal band around the annular body 47 of the outer bypass duct wall 39, and/or may form a discontinuous ring around the engine and define a discontinuous annular fluid passageway between the metal band and the outer bypass duct wall 39. Another embodiment (not shown) comprises a metal tube(s) mounted to the outer bypass duct wall 39. The heat exchanger 45 may be completely contained, and need not necessarily require co-operation from the bypass duct to contain the fluid to be cooled, as cooler 53 does above.

The engine case and bypass arrangement can be of any suitable type, as well.

Still other modifications to the above-described embodiments of the present invention will be apparent to those skilled in the art upon reading the present disclosure, and such modifications are intended to be within the scope of the appended claims. The foregoing description is therefore intended to be exemplary rather than limiting, and the scope of the invention is intended to be limited solely by the appended claims.

We claim:

1. A cooling apparatus for cooling a fluid in a bypass duct of a gas turbine engine, the apparatus comprising a heat exchanger mounted entirely inside an annular portion of the bypass duct, the heat exchanger mounted to only one annular peripheral wall defining an annular periphery of the annular portion of the bypass duct, the heat exchanger mounted so that only an external peripheral surface of the heat exchanger is directly exposed to an airflow through the bypass duct, the heat exchanger co-operating with the peripheral wall to define therebetween a fluid passageway extending substantially parallel to the annular wall, the fluid passageway being in fluid communication with a source of liquid to be cooled.

2. The cooling apparatus as claimed in claim 1 wherein the heat exchanger member is a piece of sheet metal mounted to the outer annular wall of the bypass duct.

3. The cooling apparatus as claimed in claim 2 wherein the piece of sheet metal comprises a depressed portion at least partially defining the fluid passageway.

4. A gas turbine engine comprising:
   an annular bypass duct adapted to direct bypass air through the engine; and
   a fluid passageway provided adjacent the bypass duct and extending substantially parallel to an annular peripheral wall defining the duct, the fluid passageway being in fluid communication with an oil system of the gas turbine engine, the fluid passageway directly exposed with the air passing through the bypass duct, the fluid passageway defined by only one outer annular peripheral wall defining the duct cooperating with a piece of sheet metal with a depressed portion mounted to said one peripheral wall.

5. The gas turbine engine as claimed in claim 4, wherein said fluid passageway is provided on an outer surface of said outer annular peripheral wall of the bypass duct.

\* \* \* \* \*